Feb. 3, 1931.  E. T. THIEM  1,790,686
APPARATUS FOR FEEDING BAGS
Filed Sept. 24, 1928   6 Sheets-Sheet 1
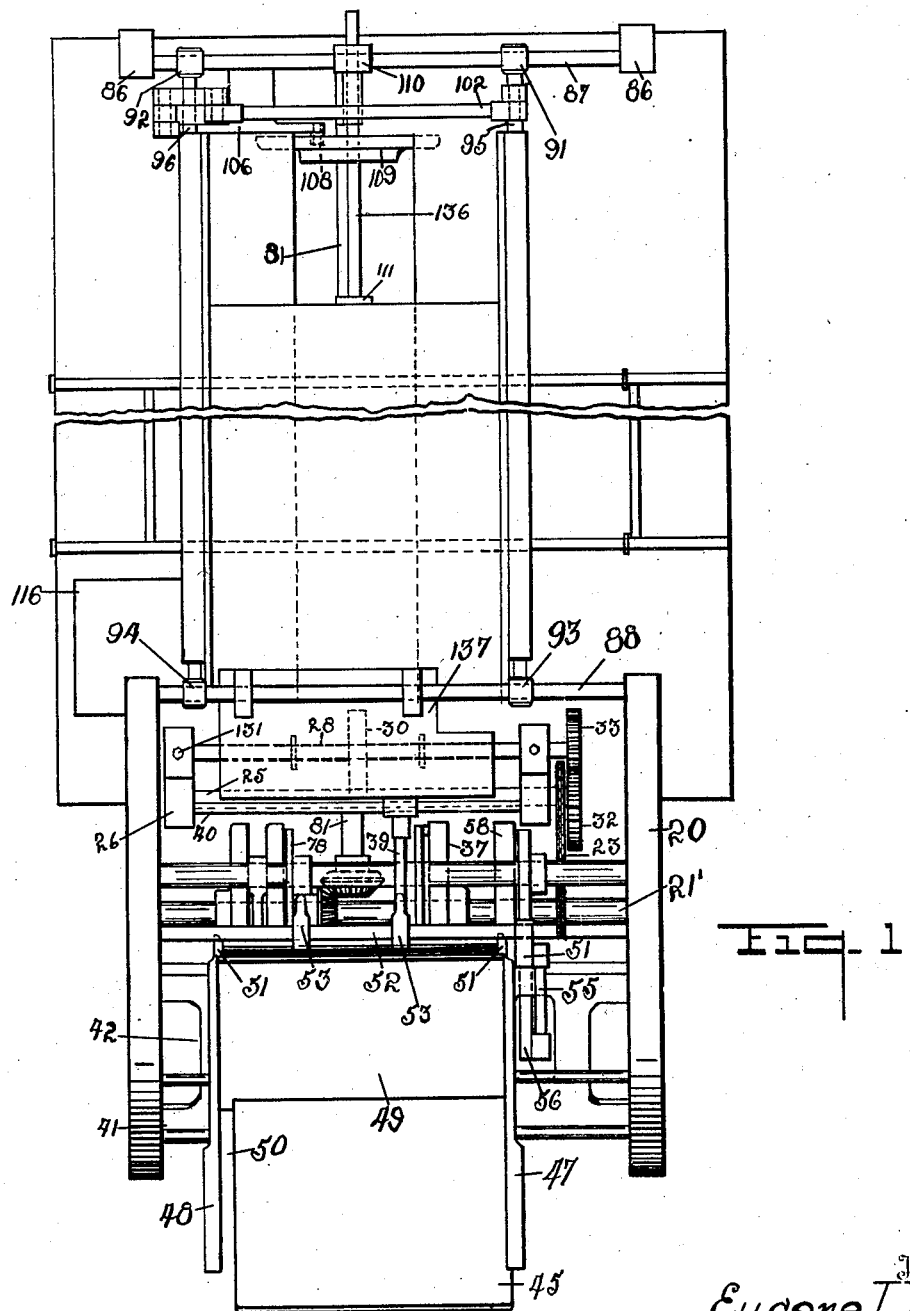
Inventor
Eugene T. Thiem
By Owen & Owen
Attorneys

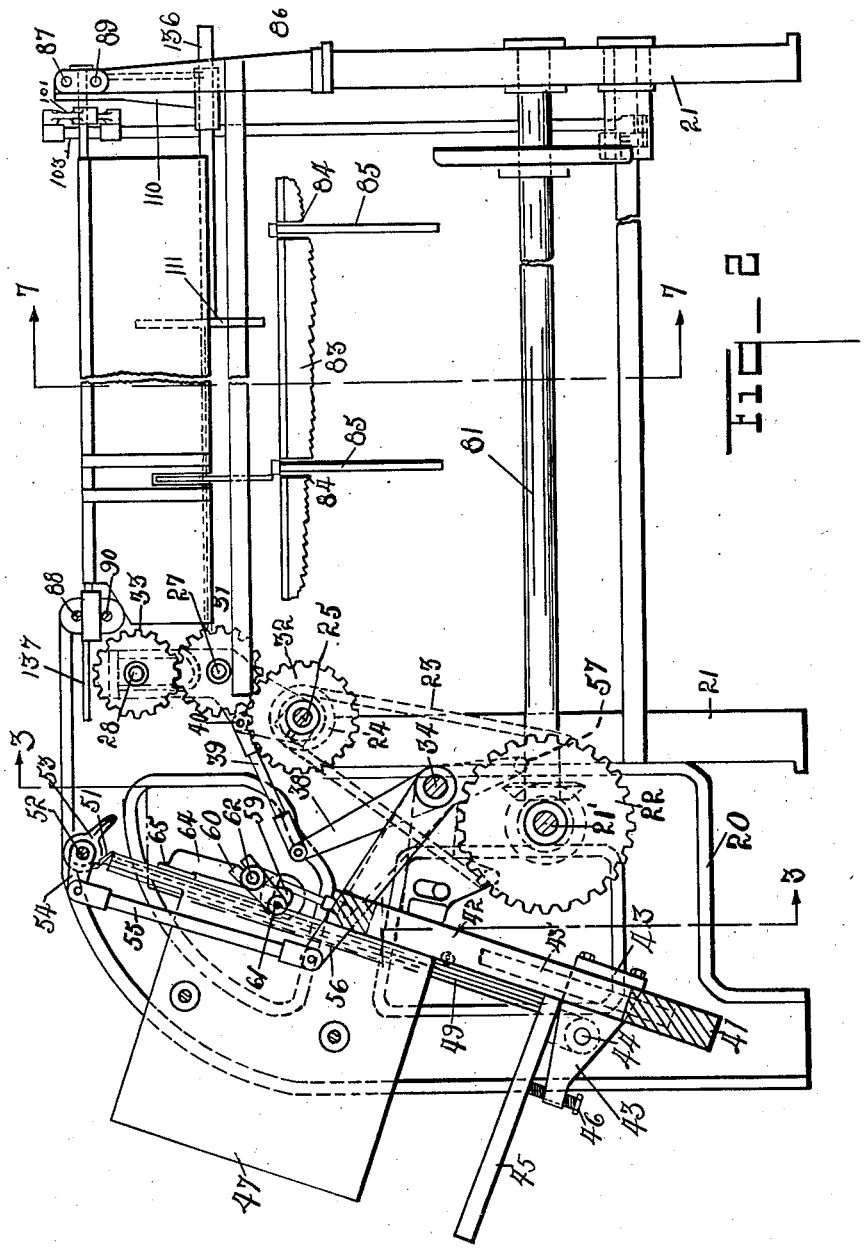

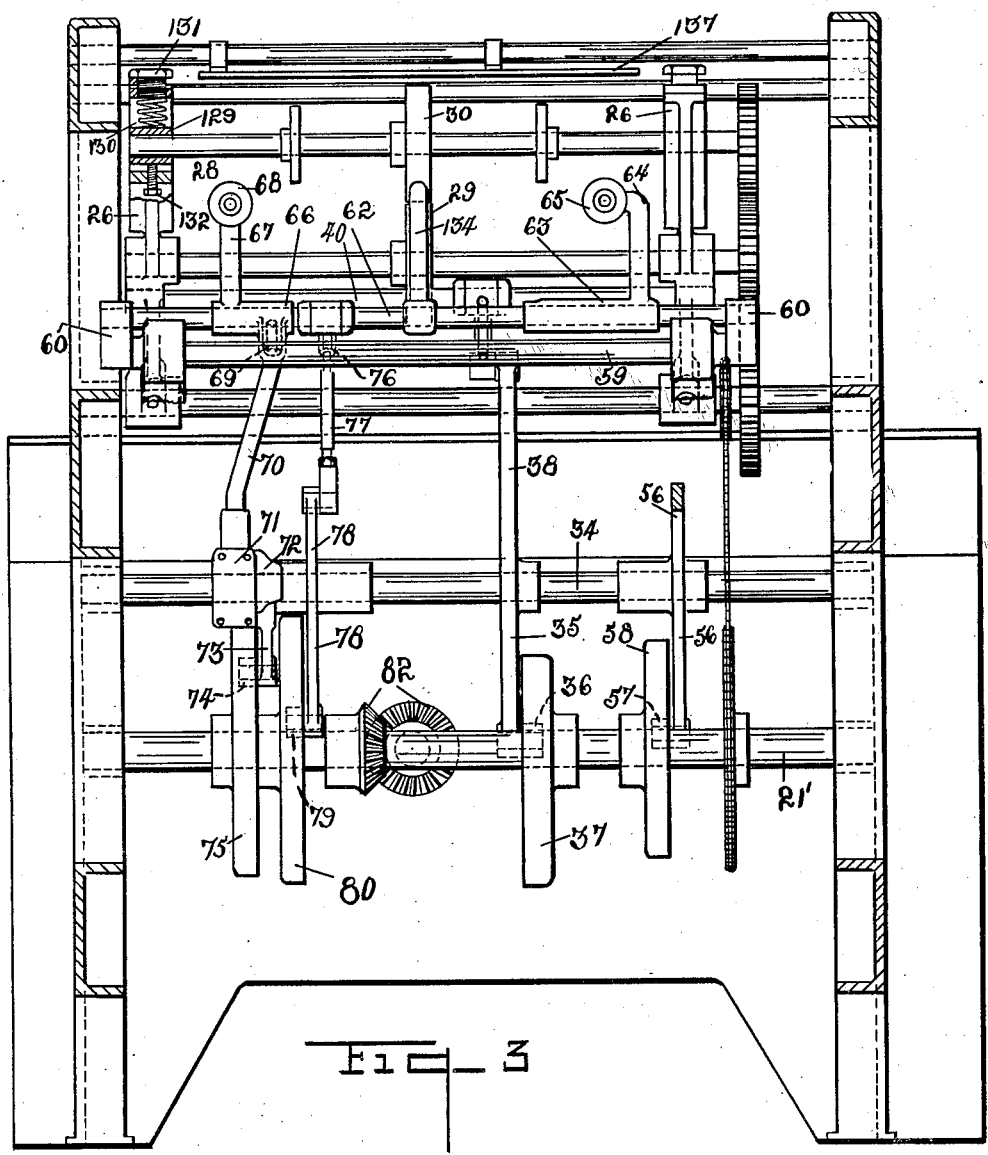

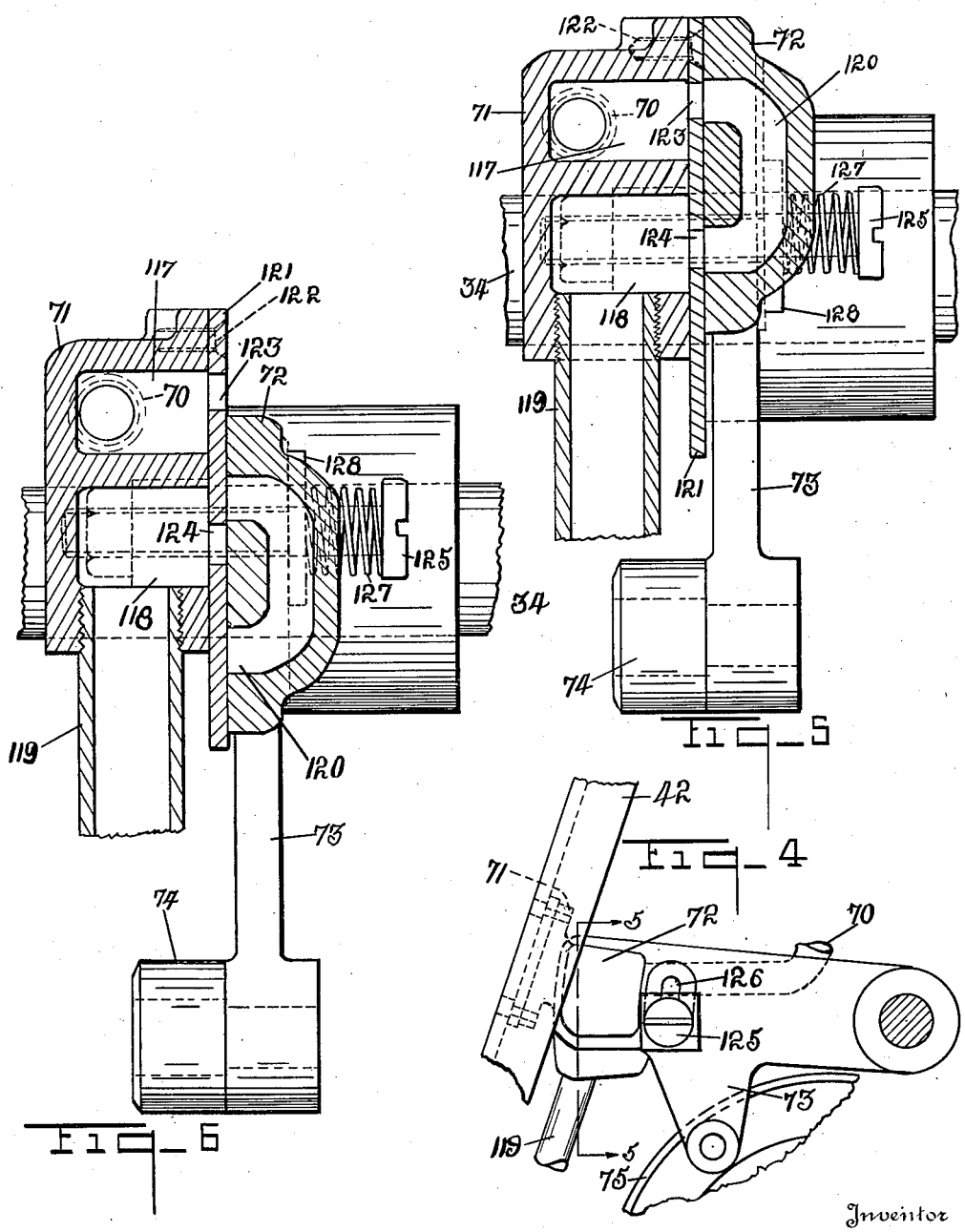

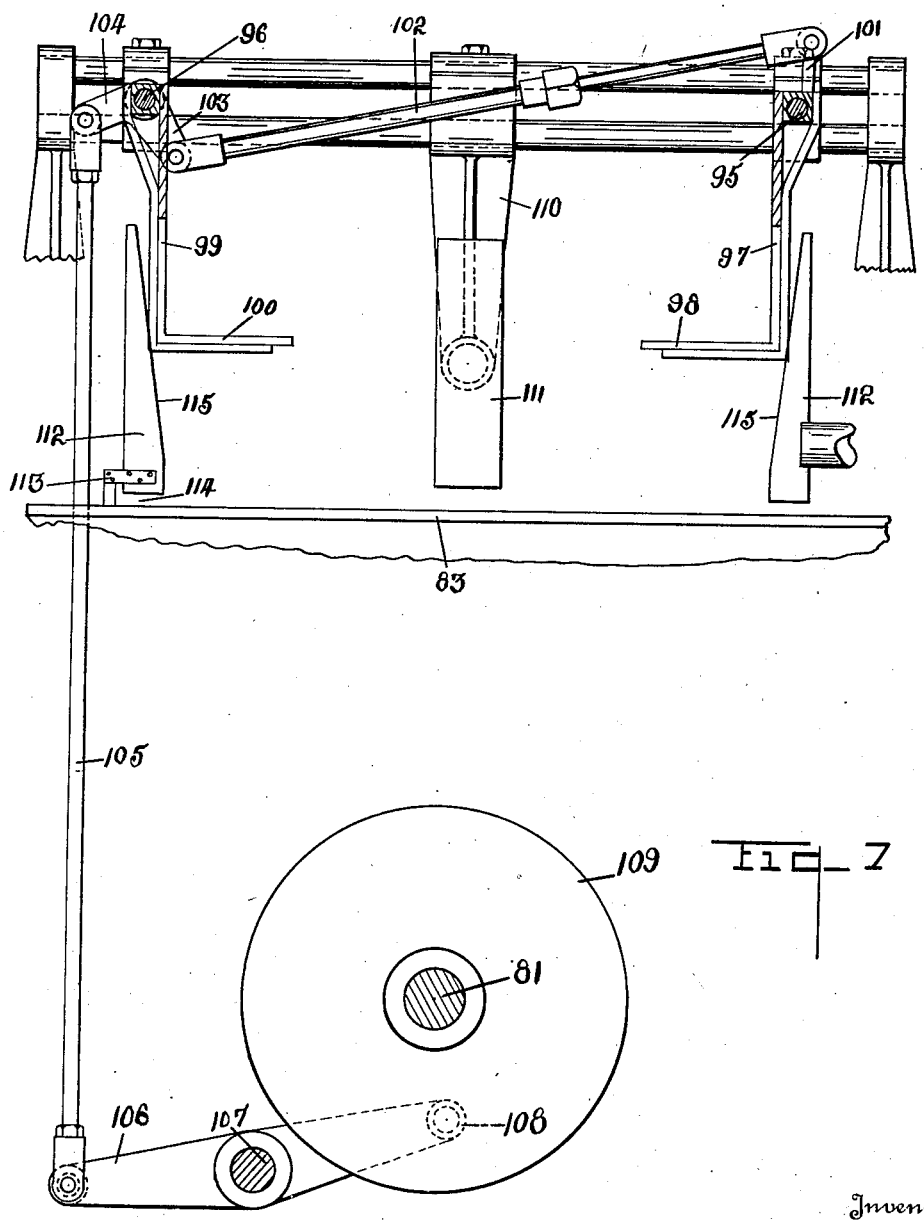

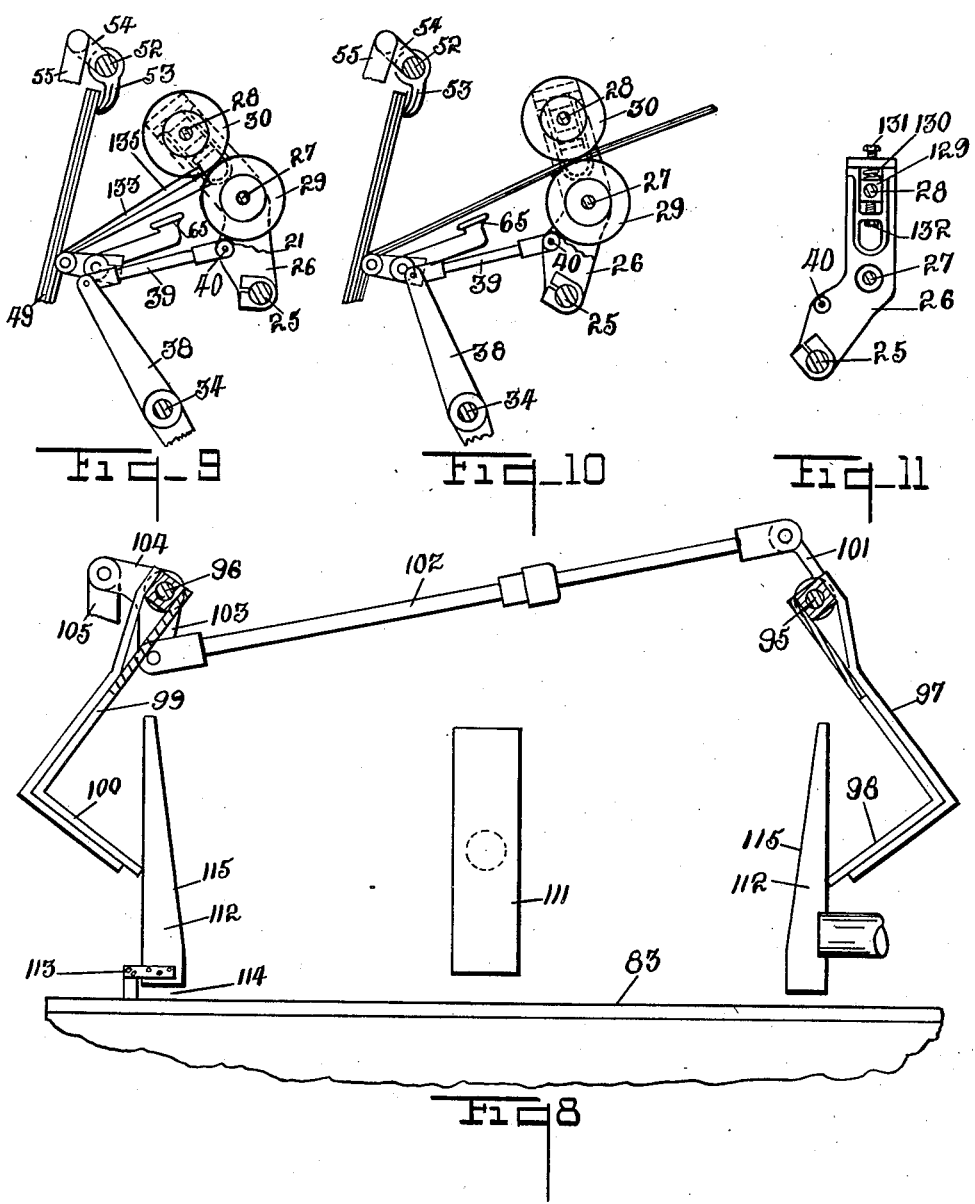

Patented Feb. 3, 1931

1,790,686

UNITED STATES PATENT OFFICE

EUGENE T. THIEM, OF CHICAGO, ILLINOIS, ASSIGNOR TO BATES VALVE BAG CORPORATION, OF CHICAGO, ILLINOIS, A CORPORATION OF DELAWARE

APPARATUS FOR FEEDING BAGS

Application filed September 24, 1928. Serial No. 307,835.

This invention relates to means for feeding bags or bag blanks, and more particularly to means for feeding the blanks to mechanisms for further operation thereon, where the positioning of the bag blanks with respect to such mechanism should be accurate.

In the accompanying drawings forming a part of this specification, the bag feeding means is shown in connection with some of the cooperating parts of a valve forming device, the valve forming device constituting no part of the present invention, but being indicated merely to illustrate one of the uses of the present invention.

In the drawings, Figure 1 is a plan view of one form of mechanism embodying this invention; Fig. 2 is a side elevation looking from the right side of Fig. 1; Fig. 3 is a section substantially on the line 3—3 of Fig. 2; Fig. 4 is a detail of the operating device for the vacuum cups; Fig. 5 is a section on the line 5—5 of Fig. 4; Fig. 6 is a section similar to Fig. 5, but showing the parts in a different position; Fig. 7 is a section substantially on the line 7—7 of Fig. 2; Fig. 8 is a view similar to a portion of Fig. 7, showing the parts in a different position; Figs. 9 and 10 are somewhat diagrammatic views illustrating the operation of feed rollers; Fig. 11 is a detail view showing the mounting of the feed rollers.

In the construction shown, the feeding device is mounted for the greater part in a frame 20 adapted to be attached to one side of a frame 21 which supports the valver in connection with which the device works. It will be readily understood that this framework may be constructed as one frame, or in any convenient manner to properly support the working parts.

Mounted in frame 20 there is a shaft 21' which may be driven in any desired manner. Shaft 21' is provided with a sprocket wheel 22 connected by a chain 23 with a sprocket wheel 24 on a shaft 25. Mounted on shaft 25 there are arms 26 in which there are mounted shafts 27 and 28 carrying rollers 29 and 30. Mounted on the end of shaft 27 there is a gear wheel 31 meshing with a gear wheel 32 on shaft 25 and with a gear wheel 33 on shaft 28. Mounted between shafts 21' and 25 there is a bearing shaft 34. A lever mounted on shaft 34 has a downwardly extending arm 35, which carries a roller 36 adapted to operate in a suitable groove in cam 37 mounted upon shaft 21', and an upwardly directed arm 38 which is connected by a link 39 with a pivot 40 mounted on arms 26.

Extending from the side members of frame 20 there are members 41 supporting a plate 42 in a plane slightly inclined to the vertical. A bracket 43, mounted on plate 42, supports a pivot rod 44 on which there is mounted an adjustable bottom support 45. Support 45 may be adjusted about pivot 44 by means of a set screw 46, and bracket 43 may be mounted adjustably on rod 43' in member 42. Supported upon suitable framework at the sides and above plate 42 there are side guide plates 47 and 48. A series of bags 49 may be stood upon end on support 45 between plates 47 and 48 and resting against plate 42. As shown in Fig. 1, support 45 terminates short of the plane of plate 48 so that there is provided a space 50 between the vertical plane of the inner side of plate 48 and the edge of support 45. This space is provided for the purpose of accommodating an extension on the end of a bag blank for forming a valve at a corner of a bag. It will be readily understood that support 45 will in all cases be adapted to the form of blank which it is intended to support.

Mounted above the upper ends of the bags and in position to contact the bag resting against plate 42 there is a spring finger 51 at each side of the bag. Just above the upper end of the bag there is mounted a rock shaft 52 provided with one or more fingers 53. Rock shaft 52 is provided with an arm 54 connected by a link 55 to the end of a lever 56 mounted to rock on shaft 34. The other end of lever 56 carries a roller 57 operating in a suitable cam groove in a cam 58 mounted on shaft 21'. Mounted above plate 42 and with one side in line with the bag-contacting surface of plate 42 there is an anti-friction roller 59. Arms 60 are mounted upon pivots 61 in line with the bag-contacting side of roller 59. Shaft 62 is mounted in arms 60, and is hollow for a considerable portion of its length. At the right end of shaft 62, as viewed in Fig. 3, there is fixed a sleeve 63 carrying a hollow arm 64 at the outer end of which there is mounted a vacuum cup 65. At the left end of the shaft there is fixed upon the shaft a sleeve 66 carrying an arm 67 to the outer end of which there is attached a vacuum cup 68. A pipe 70 connects sleeve 66 to a fixed member 71 of a vacuum valve, said member 71 being attached to plate 42. A movable member 72 of a vacuum valve cooperates with member 71 to control the connection through pipe 70. Member 72 is mounted on an arm 73 pivoted on shaft 34. Arm 73 carries a roller 74 working in a suitable groove in cam 75 mounted on shaft 21'.

An arm 76 attached to shaft 62 is connected by a link 77 to one end of a lever 78 mounted on shaft 34. The other end of lever 78 carries a roller 79 working in a suitable cam groove in cam 80 mounted on shaft 21'.

Mounted at right angles to shaft 21' there is a shaft 81 connected by bevel gearing 82 to shaft 21'.

Mounted on frame 21 there is shown diagrammatically in Fig. 2 a table 83 provided with grooves 84 through which there may operate suitable guide moving devices 85. These devices form no part of the present invention and are merely illustrated diagrammatically to indicate their location.

Extending upward from frame 21 there are brackets 86 carrying a supporting rod 87. In the upper end of frame 20 there is mounted a supporting shaft 88 parallel with shaft 87. Beneath shafts 87 and 88 there are parallel shafts 89 and 90. Sliding on the shafts 87 and 89 there are blocks 91 and 92 and sliding on shafts 88 and 90 there are similar blocks 93 and 94. Mounted in blocks 91 and 93 there is a rock shaft 95 and mounted in blocks 92 and 94 there is a rock shaft 96. Side pieces 97 having inwardly turned lower ends 98 are mounted on shaft 95. Extending upwardly from shaft 95 there is an arm 101 to which there is pivoted a link 102 connecting it to a downwardly extending arm 103 on shaft 96. An arm 104 extending outwardly from shaft 96 is connected by a link 105 to the end of a lever 106 fulcrumed at 107, as shown in Fig. 7, and carrying on its other end a roller 108 adapted to operate in a suitably formed cam groove in the face of a cam 109 on shaft 81.

Midway between blocks 91 and 92 there is mounted on shafts 87 and 89 a block 110 which carries a stop member 111.

Mounted above table 83 there are guide members 112. These guide members are mounted upon suitable brackets 113 so as to provide a space 114 between them and the upper surface of table 83, space 114 being sufficient to receive a bag therein. Each member 112 is provided with a beveled surface 115 substantially in line with the inner surface of the respective member 97 or 99 thereover.

At one corner of table 83 there is shown a housing 116 within which suitable valve forming mechanism may be located. The construction of this valve forming mechanism forms no part of the present invention, but is indicated merely to show one use to which the feeder may be applied.

Valve member 71 is provided with a chamber 117 to which pipe 70 is connected, and with a chamber 118 which is connected by a pipe 119 with any suitable means for exhausting air. Valve member 72 is provided with a U-shaped passage 120. A plate 121 is attached to the face of member 71 by means of screws 122 or other suitable means. Plate 121 is provided with a passage 123 opposite chamber 117 and with a passage 124 opposite chamber 118. U-shaped passage 120 is of such dimensions as to register with passages 123 and 124 when properly positioned.

A screw 125 passes through a slot 126 in member 72 and is threaded into member 71. A spring 127 is compressed between the head of screw 125 and a plate or washer 128 resting against member 72. In this manner member 72 is spring pressed against plate 122.

The upper ends of arms 26 are provided with slideways for blocks 129 in which shaft 28 is mounted. Boxes 129 are normally held down by springs 130 which may be adjusted by screws 131. Stop screws 132 for limiting the downward movement of boxes 129 may be provided if desired.

In operating the described mechanism, plate 45 is adjusted to the proper position and a bundle of bags 49 is placed thereon in the position in which they are shown in Fig. 2. As shaft 21 is driven by suitable means, lever 78 is rocked to position vacuum cups 65 and 68 against the upper ends of the bag, as shown in Fig. 2. At the same time, member 73 is rocked to move member 72 to the position in which it is shown in Fig. 5. Thereupon air is evacuated from vacuum cups 65 and 68 through their respective arms and hollow shaft 62, pipe 70, chamber 117, passage 120, chamber 118 and pipe 119. The vacuum cups are then rocked back towards the position in which they are shown in Fig. 9.

Just prior to the time when vacuum cups 65 and 68 start their working movement, shaft 52 is rocked so as to position fingers 53 in the position in which they are shown in Fig. 2, so as to release the top of the bag except for the retarding influence of spring fingers 51. When the vacuum cups move to the right, as viewed in Figs. 2 and 9, the upper end 133 of the bag to which they are applied is drawn from under fingers 51 towards the position in which it is shown in Fig. 9. Immediately after the top of the bag passes fingers 53 they are swung downward to the position in which they are shown in Fig. 9 so as to hold the tops of the remaining bags in proper position. These bags are retarded by fingers 51 sufficiently to allow fingers 53 to perform this function. Fingers 53 continue to move far enough to relieve the pressure of the remaining bags against the bag that is being removed.

As will appear clearly from Fig. 3, the vacuum cups are applied near the edges of the bags. In order to prevent the bags from sagging between the edges, a supporting finger 134 is provided midway between the vacuum cups and in the same plane as rollers 29 and 30.

Lever 38 is moved so that rollers 28 and 29 are moved to the position in which they are shown in Fig. 9 immediately after the upper end of the bag is shown lowered into the position in which it is shown in that figure. The device is adapted to operate with bags which have gusset folds in their sides and these folds may open up somewhat, as shown at 135 in Fig. 9, but the middle of the bags resting on finger 134 is readily directed into the bite of rollers 29 and 30 as these rollers are swung to the left as viewed in Fig. 9. When the top of the bag is properly positioned with respect to rollers 29 and 30, member 73 is moved so as to lower member 72 from the position in which it is shown in Fig. 5 to that in which it is shown in Fig. 6, thereby breaking the connection between chambers 117 and 118 and exposing passage 123, thereby breaking the vacuum in the vacuum cups and releasing the bag therefrom.

Rollers 29 and 30 are continuously revolved by means of gearing 31, 32, 33, etc., and turn in a direction to feed the bag to the right as viewed in Figs. 2, 9 and 10. At the same time that the rollers are feeding the bag to the right because of their turning action, lever 38 swings arms 26 to the right also, thereby returning them to the position in which they are shown in Fig. 2. The bag which the rollers are thus drawing from the bundle is drawn up over antifriction roller 59. The bags resting against the bag which is thus being drawn out are prevented from being pulled upward with it by fingers 51 and 53 at their upper ends.

The parts are so positioned that as rollers 29 and 30 continue to feed the bag to the right it rests upon supports 98 and 100 and is fed to the right until its end encounters stop 111. For rapid operation the bag must be fed with such speed that it has considerable momentum and may encounter stop 111 with sufficient force to cause bounding back of the bag. The distance from the stop to rollers 29 and 30 is such that the end of the bag is still gently urged forward by contact with roller 29 until its end rests against stop 111. Stop 111 is supported from bracket 110 by means of a rod 136 which may be adjusted longitudinally to support the stop in the proper position.

When desired, a plate 137 may be mounted on rods 88 and 90 in position to stop the upward movement of the bag and deflect its upper end towards stop 110.

The operation of fingers 53 agitates the bundle of bags sufficiently so that they work down on bottom support 45 to plate 42, when plate 45 is adjusted at the proper angle; but other arrangements may be made for working the bottom of the bags against plate 42, if preferred.

Numerous changes may be made in the described apparatus within the scope of the appended claims.

What I claim is:

1. A bag feeding device comprising means to hold a bundle of bags, means to separate one end of one bag from a bundle resting on said holder, means to seize the end of a bag thus bent away from the bundle and feed the bag away from the bundle in a substantially horizontal plane, a dropping frame in position to receive a bag from said feeding means, said dropping frame comprising supports for supporting the bag in a substantially horizontal position, means for removing said supports simultaneously so as to drop the bag without tipping it from a horizontal plane and guides beneath said support for the sides of the bag slanting downward towards each other to guide the dropped bag into accurate position.

2. A bag feeding device comprising a support adapted to hold a bundle of bags in a substantially vertical position, means to bend the upper end of one bag away from a bundle of bags resting on said support, means to seize the end of the bag thus bent away and feed it away from the bundle in a substantially horizontal plane, a dropper in position to receive a bag thus fed away from the bundle, said dropper comprising supports for supporting the bag in substantially horizontal position, and means for simultaneously removing said supports and guides in position to contact the edges of a bag as it falls from said support and guide it into accurate position.

3. A bag feeding apparatus comprising a support adapted to hold a bundle of bags in substantially vertical position, means to bend the upper end of a bag away from a bundle resting on said support, a dropper comprising an end stop, side guides slanting downwards towards each other, and supports adapted to support the bag in a substantially horizontal position, and means adapted to seize the bent away end of a bag near its center and feed the bag by contact along its central line into the dropper between the side guides and against the end stop.

4. Apparatus for feeding bags comprising a support adapted to hold a bundle of bags in substantially vertical position, said support comprising a side plate and a bottom plate, means mounting the bottom plate on the side plate adjustable vertically of the side plate, means for adjusting the angle between the bottom plate and the side plate, a roller at the upper end of the side plate, means for bending the upper end of a bag resting against the side plate and roller over the roller, fingers adjacent the upper end of a bundle of bags resting on said support, means operating in timed relation with said means for bending the upper end of a bag to oscillate said fingers and press the upper end of the bundle away from the bag whose upper end is bent over the roller.

5. Apparatus for feeding bags comprising a support adapted to hold a bundle of bags in substantially vertical position, said support comprising a side plate and a bottom plate, means mounting the bottom plate on the side plate adjustable vertically of the side plate, means for adjusting the angle between the bottom plate and the side plate, a roller at the upper end of the side plate, means for bending the upper end of a bag resting against the side plate and roller over the roller, fingers adjacent the upper end of a bundle of bags resting on said support, means operating in timed relation with said means for bending the upper end of a bag to oscillate said fingers and press the upper end of the bundle away from the bag whose upper end is bent over the roller, and spring fingers adapted to contact the upper end of the bundle and prevent the upper end of the bundle following the bent away end of said bag before the oscillatable fingers are moved against the upper end of the bundle.

6. A bag feeding device comprising a support adapted to hold a bundle of bags in a substantially vertical position, means to bend the upper end of a bag away from a bundle resting on the support, means to retard the upper end of the bundle from following said bent away end of a bag, means to press the upper end of the bundle backward away from said bent away end of a bag, a pair of rollers mounted on horizontal axes, means to move said axes so as to bring the bite of the rollers against said bent away end of a bag, means to thereafter move said axes away from the bundle, means to rotate the rollers while their axes are moving away from the bundle to feed the bag between said rollers away from the bundle, a dropper in position to receive the bag from said rollers, said dropper comprising supports adapted to support the bag in a substantially horizontal position, and a stop, and adjustable means for mounting the stop at such a distance from the end of the travel of said rollers that the bag is discharged from the bite of the rollers before it contacts said stop but the lower of said rollers continues to gently press the bag against the stop, and means to simultaneously remove the supports of said dropper from beneath the bag.

In testimony whereof I have hereunto signed my name to this specification.

EUGENE T. THIEM.

CERTIFICATE OF CORRECTION.

Patent No. 1,790,686. Granted February 3, 1931, to

EUGENE T. THIEM.

It is hereby certified that the above numbered patent was erroneously issued to "Bates Valve Bag Corporation, of Chicago, Ill.", whereas said patent should have been issued to St. Regis Paper Company, of New York, N. Y., a corporation of New York, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 3rd day of March, A. D. 1931.

(Seal)

M. J. Moore,
Acting Commissioner of Patents.